United States Patent
Saito et al.

(10) Patent No.: US 10,578,918 B2
(45) Date of Patent: Mar. 3, 2020

(54) DIRECT BACKLIGHT UNIT

(71) Applicant: FUJIFILM Corporation, Tokyo (JP)

(72) Inventors: Yukito Saito, Kanagawa (JP); Kotaro Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/013,473

(22) Filed: Jun. 20, 2018

(65) Prior Publication Data
US 2018/0299730 A1    Oct. 18, 2018

Related U.S. Application Data

(63) Continuation of application No. PCT/JP2016/005185, filed on Dec. 20, 2016.

(30) Foreign Application Priority Data

Dec. 25, 2015   (JP) ................................ 2015-253913

(51) Int. Cl.
| | |
|---|---|
| *G02F 1/1335* | (2006.01) |
| *G02B 5/20* | (2006.01) |
| *G02B 5/30* | (2006.01) |

(52) U.S. Cl.
CPC ......... *G02F 1/133605* (2013.01); *G02B 5/20* (2013.01); *G02B 5/30* (2013.01);
(Continued)

(58) Field of Classification Search
CPC . G02F 1/133605; G02F 1/13362; G02B 5/20; G02B 5/30
(Continued)

(56) References Cited

U.S. PATENT DOCUMENTS

| | | | |
|---|---|---|---|
| 6,515,785 B1* | 2/2003 | Cobb, Jr. | G02B 5/0236 349/62 |
| 6,778,235 B2* | 8/2004 | Takahashi | G02B 6/0048 349/65 |

(Continued)

FOREIGN PATENT DOCUMENTS

| | | |
|---|---|---|
| CN | 1252515 C | 4/2006 |
| CN | 102236198 A | 11/2011 |

(Continued)

OTHER PUBLICATIONS

International Search Report issued in PCT/JP2016/005185 dated Apr. 25, 2017.
(Continued)

*Primary Examiner* — Bryon T Gyllstrom
(74) *Attorney, Agent, or Firm* — Edwards Neils LLC; Jean C. Edwards, Esq.

(57) ABSTRACT

A direct backlight unit includes: a rear-side reflective plate; a light source which is disposed on a reflection surface side of the rear-side reflective plate; a perforated reflective plate which is disposed to face the rear-side reflective plate through the light source and has a plurality of fine holes, which penetrate from a light source-side surface to an emission-side surface facing the light source-side surface and transmit light, and in which both the light source-side surface and the emission-side surface are reflection surfaces and a depolarization degree of the emission-side surface is 60% or less; and a circular polarization reflection film which is disposed on the emission-side surface side of the perforated reflective plate.

9 Claims, 3 Drawing Sheets

(52) U.S. Cl.
CPC .... *G02F 1/13362* (2013.01); *G02F 1/133603* (2013.01); *G02F 2001/133607* (2013.01); *G02F 2001/133614* (2013.01)

(58) Field of Classification Search
USPC .......................................................... 362/19
See application file for complete search history.

(56) References Cited

U.S. PATENT DOCUMENTS

| | | | |
|---|---|---|---|
| 7,360,936 B2* | 4/2008 | Abu-Ageel | G02B 5/045 257/95 |
| 10,168,006 B2* | 1/2019 | Chang | G02F 1/133609 |
| 2002/0176036 A1* | 11/2002 | Kaneko | G02F 1/133536 349/65 |
| 2004/0027510 A1 | 2/2004 | Iijima et al. | |
| 2004/0189906 A1 | 9/2004 | Kim | |
| 2004/0218390 A1* | 11/2004 | Holman | G02B 5/045 362/245 |
| 2004/0264350 A1* | 12/2004 | Ueki | G02B 5/3058 369/112.16 |
| 2005/0084670 A1* | 4/2005 | Satake | G02B 5/30 428/343 |
| 2006/0007371 A1* | 1/2006 | Miyatake | G02B 5/30 349/96 |
| 2008/0123321 A1* | 5/2008 | Hsu | G02F 1/133608 362/19 |
| 2009/0003002 A1* | 1/2009 | Sato | G02B 6/0043 362/341 |
| 2010/0046234 A1* | 2/2010 | Abu-Ageel | G02B 3/0006 362/308 |
| 2010/0091349 A1* | 4/2010 | Ito | G11B 7/128 359/30 |
| 2011/0255154 A1* | 10/2011 | Nagase | G02B 5/208 359/352 |
| 2011/0261289 A1 | 10/2011 | Park et al. | |
| 2012/0229735 A1* | 9/2012 | Miyatake | G02F 1/13363 349/96 |
| 2012/0243208 A1* | 9/2012 | Ying | G02F 1/133603 362/97.1 |
| 2013/0038822 A1* | 2/2013 | Aono | C08J 3/14 349/96 |
| 2013/0328866 A1* | 12/2013 | Woodgate | G02B 6/005 345/419 |
| 2014/0313462 A1* | 10/2014 | Kibe | G02F 1/134309 349/106 |
| 2017/0162133 A1* | 6/2017 | Sekiguchi | G02B 6/005 |

FOREIGN PATENT DOCUMENTS

| | | |
|---|---|---|
| JP | S63-168626 A | 7/1988 |
| JP | 2000-057832 A | 2/2000 |
| JP | 2000057832 A | 2/2000 |
| JP | 2000-241808 A | 9/2000 |
| JP | 2000-284268 A | 10/2000 |
| JP | 2000284268 A | 10/2000 |
| JP | 2010-267826 A | 11/2010 |
| JP | 2010267826 A | 11/2010 |
| JP | 2012-204345 A | 10/2012 |

OTHER PUBLICATIONS

Written Opinion issued in PCT/JP2016/005185 dated Apr. 25, 2017.
International Preliminary Report on Patentability completed by WIPO dated Jul. 5, 2018, in connection with International Patent Application No. PCT/JP2016/005185.
Office Action, issued by the State Intellectual Property Office dated Aug. 2, 2019 in connection with Chinese Patent Application No. 201680075656.7.
Office Action Issued by the Japanese Patent Office dated May 14, 2019 in connection with Japanese Patent Application No. 2017-557708.

* cited by examiner

DIRECT BACKLIGHT UNIT

CROSS-REFERENCE TO RELATED APPLICATIONS

This application is a continuation application of International Application No. PCT/JP2016/005185 filed Dec. 20, 2016, which was published under PCT Article 21(2) in Japanese, and which claims priority under 35 U.S.C. § 119(a) to Japanese Patent Application No. 2015-253913, filed Dec. 25, 2015. The above applications are hereby expressly incorporated by reference, in their entirety, into the present application.

BACKGROUND OF THE INVENTION

1. Field of the Invention

The present invention relates to a backlight unit used for a liquid crystal display and particularly relates to a direct backlight unit.

2. Description of the Related Art

Since a liquid crystal display (hereinafter, also referred to as an LCD) has a low power consumption and can be used as a space-saving image display device, the applications thereof have been expanding year by year. For example, the liquid crystal display is configured such that a backlight unit, a backlight-side polarizing plate, a liquid crystal panel, and a viewing side polarizing plate are provided in this order.

As a backlight unit, a direct backlight unit which includes a light source disposed below an emission surface thereof or a side light type backlight unit which includes a light source disposed on a side of an emission surface thereof has been known.

A backlight unit has a great impact on the performance of an LCD such as the luminance or visibility of an image. Accordingly, various suggestions for improving the luminance of light (backlight) emitted by a backlight unit have been made.

For example, disposition of a reflective polarizing plate on an emission surface side of a backlight unit as a film for improving the luminance has been suggested. A reflective polarizing plate transmits predetermined polarized light and reflects polarized light other than the predetermined polarized light. In a case where a reflective polarizing plate is used, the reflective polarizing plate transmits only linearly polarized light responding to a backlight-side polarizing plate, allows the transmitted light to be incident on the backlight-side polarizing plate, reflects polarized light other than the linearly polarized light so that retroreflection is repeated in a backlight unit, and allows the reflected light to be incident on the reflective polarizing plate again so that the light can be reused.

JP1988-168626A (JP-S63-168626A) suggests a direct backlight unit which includes a reflective polarizer on a side of a diffuse emission surface that emits light from a light source and has a configuration in which a reflective plate is disposed on an opposite side of a diffusion plate of the light source so that the light reflected by the reflective polarizer is reflected to the reflective polarizer again due to the reflective plate in order to improve the luminance.

Further, JP2012-204345A suggests a direct backlight unit which includes a semi-transmissive semi-reflective layer between a light source and a diffusion plate as a configuration of realizing uniform light distribution by promoting mixed light between the light source and the diffusion plate without increasing the distance therebetween.

SUMMARY OF THE INVENTION

As described in JP1988-168626A (JP-S63-168626A) and JP2012-204345A, a typical direct backlight unit of the related art includes a diffusion plate. In JP1988-168626A (JP-S63-168626A), since the direct backlight unit is configured such that a polarization plane for linearly polarized light that is reflected by the reflective polarizer is randomized by the diffusion plate so that the light is reused, the quantity of reflected light which can be reused by the reflection carried out once is small. Light can be reused by repeating the reflection several times, but stray light is increased due to the repetition of reflection. Consequently, the effect of improving the luminance is not sufficient.

Further, in the configuration of JP2012-204345A in which a semi-transmissive semi-reflective film is provided between the light source and the diffusion plate, there is a problem in that the luminance is degraded due to an increase of stray light because the number of times of reflection is increased as a result of reduction in film thickness.

The present invention has been made in consideration of the above-described circumstances, and an object thereof is to provide a direct backlight unit which is used for an LCD or the like and is capable of emitting light (backlight) with high luminance by further improving light utilization efficiency.

There is provided a direct backlight unit comprising: a rear-side reflective plate; a light source which is disposed on a reflection surface side of the rear-side reflective plate; a perforated reflective plate which is disposed to face the rear-side reflective plate via the light source and has a plurality of fine holes, which penetrate from a light source-side surface to an emission-side surface facing the light source-side surface and transmit light, and in which both the light source-side surface and the emission-side surface are reflection surfaces and a depolarization degree of the emission-side surface is 60% or less; and a circular polarization reflection film which is disposed on the emission-side surface of perforated reflective plate.

The "depolarization degree" in the present invention is measured on a flat reflection surface that does not have fine holes. A method of measuring the depolarization degree will be described below.

The "fine hole" indicates a through-hole having an opening diameter of 1 mm or less. Further, in a case where the emission surface of the backlight unit is set as the surface, the "rear surface" in the rear-side reflective plate indicates the rear surface of the backlight unit which faces the surface.

In the direct backlight unit according to the present invention, it is preferable that the depolarization degree of the surface of the perforated reflective plate on the light source side is 90% or greater.

In the direct backlight unit according to the present invention, it is preferable that the emission-side surface of the perforated reflective plate is a specular reflection surface.

In the direct backlight unit according to the present invention, it is preferable that an area ratio of openings of the fine holes in the surface of the perforated reflective plate on the emission side is in a range of 10% to 50%.

In the direct backlight unit according to the present invention, it is preferable that a ratio of a thickness of the perforated reflective plate to an opening diameter of the fine holes in the surface of the perforated reflective plate on the emission side is 2 or greater.

In the direct backlight unit according to the present invention, the openings of the fine holes of the perforated reflective plate on the light source-side surface may respectively have a lens.

In the direct backlight unit according to the present invention, the circular polarization reflection film may be formed of a λ/4 film and a linearly polarized light reflection film which are disposed in order from the perforated reflective plate side and may include a cholesteric liquid crystal layer.

In the direct backlight unit according to the present invention, a wavelength conversion layer which receives light from the light source and emits light having a wavelength different from that of the light may be provided between the light source and the perforated reflective plate.

The direct backlight unit of the present invention includes: a rear-side reflective plate; a light source which is disposed on a reflection surface side of the rear-side reflective plate; a perforated reflective plate which is disposed to face the rear-side reflective plate through the light source and has a plurality of fine holes, which penetrate from a light source-side surface to an emission-side surface facing the light source-side surface and transmit light, and in which both the light source-side surface and the emission-side surface are reflection surfaces and a depolarization degree of the emission-side surface is 60% or less; and a circular polarization reflection film which is disposed on the surface side of perforated reflective plate on the emission side. Due to this configuration, it is possible to emit light (backlight) with high luminance.

DESCRIPTION OF THE PREFERRED EMBODIMENTS

Hereinafter, embodiments of a backlight unit of the present invention will be described with reference to the accompanying drawings.

In the present specification, the numerical ranges expressed using "to" indicate the ranges including the numerical values described before and after "to" as the lower limits and the upper limits.

The direct backlight unit of the present invention is mainly used for a liquid crystal display device (LCD). In an LCD, the direct backlight unit is used for emitting light (backlight) for displaying an image to a liquid crystal panel formed by arranging liquid crystal cells (liquid crystal pixels).

Figure 1:
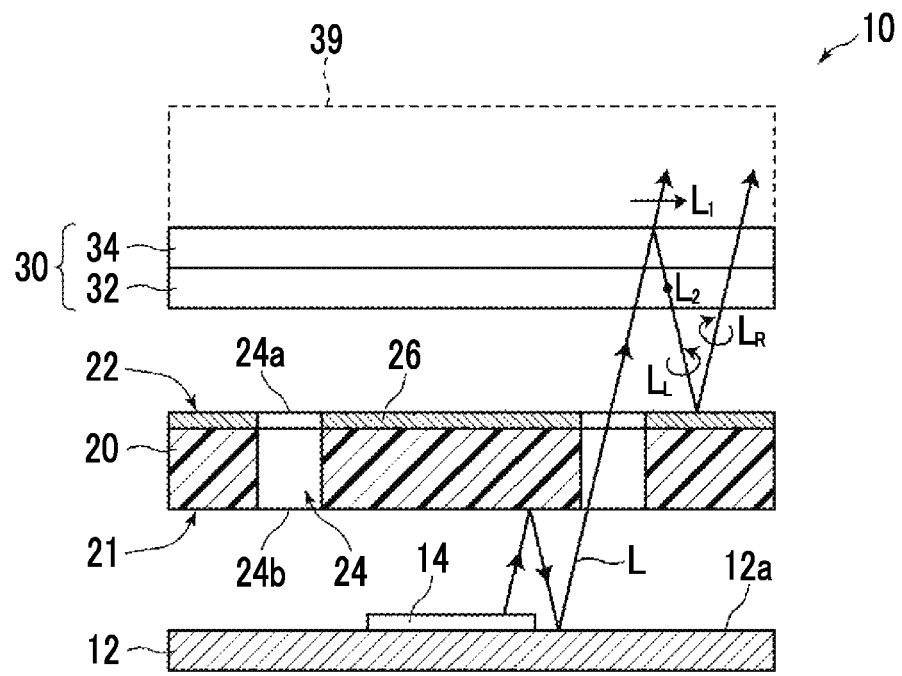
FIG. 1 is a schematic cross-sectional view schematically illustrating the configuration of a backlight unit according to a first embodiment of the present invention.

FIG. 1 is a schematic cross-sectional view schematically illustrating the configuration of a direct backlight unit according to a first embodiment of the present invention.

A backlight unit 10 of the present embodiment illustrated in FIG. 1 includes: a rear-side reflective plate 12; a light source 14 which is disposed on a reflection surface 12a side of the rear-side reflective plate 12; a perforated reflective plate 20 which is disposed to face the rear-side reflective plate 12 through the light source 14 and has a plurality of fine holes 24, which penetrate from a surface 21 on the light source 14 side to a surface 22 on an emission side facing the surface 21 on the light source 14 side and transmit light, and in which both the surface 21 on the light source side and the surface 22 on the emission side are reflection surfaces and a depolarization degree of the surface 22 on the emission side is 60% or less; and a circular polarization reflection film 30 which is disposed on the surface 22 side of the perforated reflective plate 20 on the emission side. Hereinafter, the surface 21 of the perforated reflective plate 20 on the light source side is referred to as a light source-side reflection surface 21 and the surface 22 on the emission side is referred to as an emission-side reflection surface 22.

An optical member indicated by the dashed line in FIG. 1 is a backlight-side polarizing plate 39 which is typically provided in an LCD and used for converting light incident on a liquid crystal panel into predetermined linearly polarized light.

In the backlight unit 10, light L emitted from the light source 14 is repeatedly reflected between the reflection surface 12a of the rear-side reflective plate 12 and the light source-side reflection surface 21 of the perforated reflective plate 20, transmitted through fine holes 24 of the perforated reflective plate 20, and emitted from the openings 24a on the circular polarization reflection film 30 side. Further, the light L emitted from the openings 24a is incident on the circular polarization reflection film 30. In the light L which has been incident on the circular polarization reflection film 30, circular polarization having a predetermined orientation (here, left circular polarization $L_L$) is reflected by an action of the circular polarization reflection film 30. Further, in the light L which has been incident on the circular polarization reflection film 30, other circular polarization (here, right circular polarization $L_R$) components are emitted as linearly polarized light (this will be referred to as first linearly polarized light $L_1$) having an orientation of being transmitted through the backlight-side polarizing plate 39 through the circular polarization reflection film 30. Further, the left circular polarization $L_L$ reflected by the circular polarization reflection film 30 is reflected by the emission-side reflection surface 22 of the perforated reflective plate 20 and then converted into the right circular polarization $L_R$ for reuse. By reusing the reflected light, light with high luminance can be allowed to be incident on the backlight-side polarizing plate 39 (liquid crystal panel).

In the present example, the circular polarization reflection film 30 has a λ/4 film 32 and a linearly polarized light reflection film 34, disposed in this order from the perforated reflective plate 20 side, which transmits first linearly polarized light $L_1$ and reflects second linearly polarized light $L_2$ orthogonal to the first linearly polarized light $L_1$. Therefore, light incident on the circular polarization reflection film 30 is incident on the linearly polarized light reflection film 34 through the λ/4 film 32, the first linearly polarized light $L_1$ is transmitted through the linearly polarized light reflection film 34, and the second linearly polarized light $L_2$ is reflected. Further, the second linearly polarized light $L_2$ is incident on the λ/4 film 32 again and emitted to the perforated reflective plate 20 side as circular polarization (left circular polarization $L_L$) in a predetermined direction. The left circular polarization $L_L$ is converted into right circular polarization $L_R$ after being reflected by the emission-side reflection surface 22 of the perforated reflective plate 20, converted into first linearly polarized light $L_1$ due to the action of λ/4 during transmission through the λ/4 film 32 again, and then emitted.

The fine holes 24 provided in the perforated reflective plate 20 may have light-transmitting properties of transmitting light L and the inside of the holes 24 may be a space or may be filled with a transparent material that is transparent with respect to light. Here, "having light-transmitting properties" means that the light transmittance with respect to an incidence ray is 60% or greater.

Figure 2:
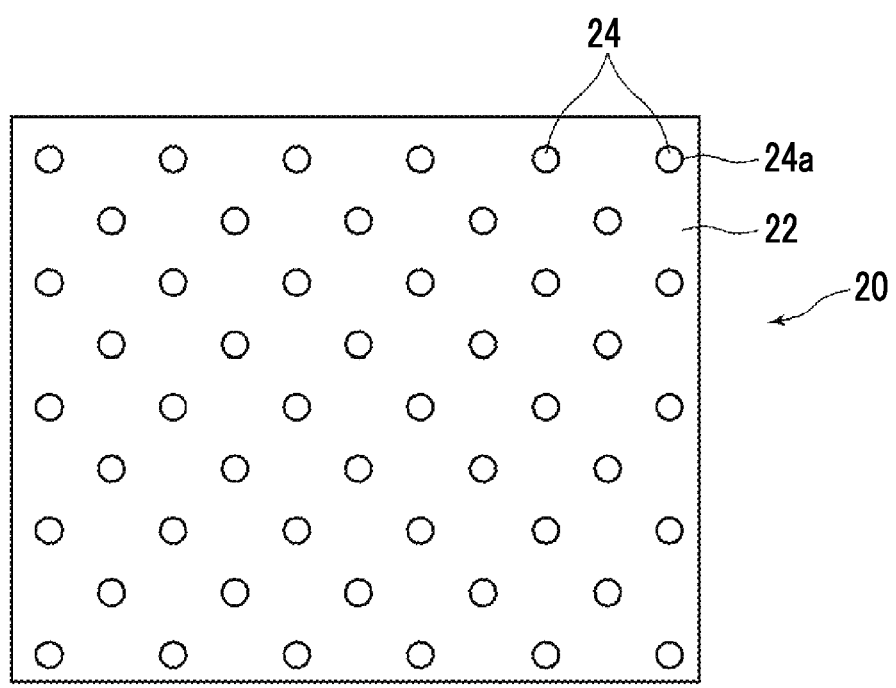
FIG. 2 is a schematic plan view illustrating an emission surface side of a perforated reflective plate.

FIG. 2 is a plan view illustrating the emission-side reflection surface 22 of the perforated reflective plate 20 when seen from the normal direction. The perforated reflective plate 20 is formed by providing a plurality of through-holes (fine holes) having a predetermined size at a predetermined pitch on a rectangular plate having a predetermined thickness. In FIG. 2, the two-dimensional arrangement of the fine holes 24 is an arrangement in which an even matrix and an odd matrix are shifted at a half pitch (so-called staggered arrangement), but the arrangement and the arrangement pitch of the fine holes 24 are not particularly limited. The arrangement of the fine holes 24 is not limited to the arrangement illustrated in FIG. 2 and may be a matrix arrangement (so-called lattice form arrangement) in which the even matrix and the odd matrix match each other or are in an random arrangement. Further, in order to make the luminance in the emission surface uniform, the fine holes 24 may be arranged in in-plane distribution by considering the distance between the fine holes 24 and the light source 14. For example, a position directly above the light source 14 may be avoided for formation of the fine holes 24 or the fine holes may be formed such that the density thereof increases as the fine holes are separated from the light source position. Further, the arrangement pitch of the fine holes 24 may be as fine as possible, and the distance of fine holes adjacent to each other is preferably in a range of 0.01 to 1.0 mm.

In FIG. 1, only one light source 14 is formed, but a plurality of light sources 14 are provided in the backlight unit 10. The number of fine holes per one light source 14 is not limited, but it is preferable that two or more fine holes per one light source 14 are provided.

The fine hole 24 may be formed vertically or obliquely to the reflection surfaces 21 and 22 of the perforated reflective plate 20. The shapes of the openings 24a and 24b of the fine hole 24 are not particularly limited and may be an ellipse, an arc, or a polygon without limitation to a circle. Further, the shapes of the openings 24a and 2b of the fine hole 24 may be the same as or different from each other. It is preferable that the fine hole 24 is a through-hole in which the shape of a cross section in parallel with the reflection surfaces 21 and 22 is a column (alternatively, an oblique column) that matches the shape of the openings, but one fine hole may be formed at a position with a different thickness and a different cross-sectional shape. Further, the fine hole 24 may have a shape in which the opening diameter gradually decreases toward the emission-side reflection surface 22 from the light source-side reflection surface 21 side.

In a case where the thickness of the perforated reflective plate 20 is set as t and the opening diameter of the fine hole 24 in the emission-side reflection surface 22 is set as d, it is preferable that the ratio t/d of the thickness t to the opening diameter d satisfies an expression of "$2 \leq t/d$". In other words, it is preferable that the thickness t of the perforated reflective plate 20 is twice or more the opening diameter of the fine hole 24. It is more preferable that an expression of "$2 \leq t/d \leq 5$" is satisfied.

Further, the opening diameter d is a diameter of a circle in a case where the opening 24a has a circular shape. The opening diameter d is a diameter (equivalent circle diameter) of a circle with the same area as the opening area in a case where the opening 24a does not have a circular shape.

The opening diameter d of the fine hole 24 is not particularly limited. For example, the opening diameter d may be set to 1 mm or less or 0.1 mm or less.

The light source-side reflection surface 21 of the perforated reflective plate 20 may be a reflection surface that efficiently reflects light incident from the light source 14 side and the depolarization degree thereof is not particularly limited. Here, the region that functions as a reflection surface is a region excluding the openings 24b of the fine holes 24 from the light source-side reflection surface 21. It is preferable that the reflectivity of the light source-side reflection surface 21 is high. Specifically, the reflectivity thereof is preferably 90% or greater and more preferably 95% or greater. From the viewpoint of sufficiently mixing light between the light source-side reflection surface 21 and the reflection surface 12a of the rear-side reflective plate 12, it is preferable that the depolarization degree of the light source-side reflection surface 21 is high. Specifically, the depolarization degree thereof is preferably 90% or greater. Further, the light source-side reflection surface 21 may reflect light through specular reflection or diffusion reflection. As the material constituting the light source-side reflection surface 21, for example, white polyethylene terephthalate (hereinafter, referred to as white PET) formed by mixing a white pigment into polyethylene terephthalate (PET) is suitable, but the material is not limited thereto.

The emission-side reflection surface 22 of the perforated reflective plate 20 is a reflection surface that reflects light (mainly reflected light that is reflected by the circular polarization reflection film 30) incident from the circular polarization reflection film 30 side, and the depolarization degree thereof is 60% or less. Further, the region that functions as the reflection surface is a region excluding the openings 24a from the emission-side reflection surface 22. It is preferable that the reflectivity of the emission-side reflection surface is high. Specifically, the reflectivity thereof is preferably 90% or greater and more preferably 95% or greater.

The circular polarization $L_L$ reflected by the circular polarization reflection film 30 is incident on the emission-side reflection surface 22, is specularly reflected by this emission-side reflection surface 22 so that the orientation of the polarized light is reversed, and is incident on the circular polarization reflection film 30 again as the circular polarization $L_R$ having an orientation of being transmitted through the circular polarization reflection film 30. Even in a case where a part of the retroreflected light is diffusively reflected by the emission-side reflection surface 22 or depolarization occurs, the light can be reused through a plurality of times of reflection. However, since stray light is generated due to the repeated reflection so that the quantity of light which cannot be reused is increased, it is preferable that the emission-side reflection surface 22 is less likely to reflect light through diffusion reflection and the depolarization degree thereof is as small as possible.

In a case where the depolarization degree of the emission-side reflection surface 22 is 60% or less, the effect of improving the luminance can be sufficiently obtained by reusing reflected light through retroreflection. Further, the depolarization degree thereof is more preferably 30% or less and still more preferably 10% or less.

In addition, from the viewpoint that the depolarization degree is small and light can be specularly reflected while the state of polarized light is maintained, it is preferable that the emission-side reflection surface 22 is a specular reflection surface. Further, a small depolarization degree is likely to be obtained in a case where the specular reflection surface is configured of a specular reflective plate formed of a single-layer film compared to a specular reflection surface that is configured of a specular reflective plate formed of a multilayer film obtained by laminating different materials. Among examples of the specular reflective plate formed of a single-layer film, it is preferable that the specular reflection surface is configured of a specular reflective plate formed of a single-layer film obtained by vapor-depositing a metal such as silver, aluminum, or tin. Among the examples, a specular reflective plate obtained by vapor-depositing silver is particularly preferable. Further, a film formed by laminating a plurality of films made of the same material is included in the range of the single-layer film.

The reflectivity and the depolarization degree of the light source-side reflection surface 21 or the emission-side reflection surface 22 of the perforated reflective plate 20 are measured as follows.

—Reflectivity—

A sample to be measured is placed on an automatic absolute reflectivity measuring device M-500V (manufactured by JASCO Corporation), the reflectivity of light incident on the surface (reflection surface) of the sample at an angle of 5° C. with respect to the normal line is measured, and this reflectivity is set as the reflectivity of the reflection surface thereof. In the present specification, the reflectivity of the reflection surface of the perforated reflective plate indicates a reflectivity of the reflection surface that does not have an opening.

—Depolarization Degree—

The luminance is measured by transmitting parallel light through a polarizer having a transmission axis at 0°, allowing the light to pass through a λ/4 plate having a slow axis at 45°, allowing the light to be incident on the surface (reflection surface) of the sample at an angle of 5° with respect to the normal line, allowing this reflected light to pass through the λ/4 plate on the emission side to pass through an analyzer, and disposing a color luminance meter (BM-5 (manufactured by TOPCON Corporation).

During measurement, the λ/plate on the emission side and the analyzer are allowed to rotate as appropriate, the angles at which a minimum luminance (Ymin) and a maximum luminance (Ymax) are obtained are found, and the depolarization degree is calculated using Equation (1) based on the minimum luminance and the maximum luminance.

$$\text{Depolarization degree}=100\times(1-(Y\max-Y\min)/(Y\max+Y\min)) \quad \text{Equation (1)}$$

In the present specification, the depolarization degree of the reflection surface of the perforated reflective plate indicates a depolarization degree of the reflection surface which does not have an opening.

The area ratio (the percentage of the total area of the openings 24a of a plurality of fine holes 24 to the total area of the emission-side reflection surface 22 that includes the opening region) of the openings 24a of the fine holes 24 to the emission-side reflection surface 22 of the perforated reflective plate 20 is preferably in a range of 10% to 50%. In a case where the area ratio of the openings 24a is 10% or greater, a decrease in quantity of light to be transmitted from the light source side can be suppressed. Further, in a case where the area ratio thereof is 50% or less, the percentage at which reflected light, which is reflected by the circular polarization reflection film 30 to be incident on the emission-side reflection surface 22, is reflected by the circular polarization reflection film 30 again can be maintained to be a certain value or higher. Therefore, the effect of improving the luminance can be obtained.

The above-described perforated reflective plate 20 can be obtained by vapor-depositing a metal such as silver on one surface of white PET, preparing a double-sided reflective plate which has a metal mirror surface as one surface and white PET as the other surface, and forming through-holes in a predetermined shape such that the double-sided reflective plate have a desired opening ratio. Further, the perforated reflective plate 20 can be also obtained by forming a metal mirror surface on a transparent PET film, adhering the PET film having the metal mirror surface to white PET, preparing a double-sided reflective plate which has a metal mirror surface as one surface and white PET as the other surface, and forming through-holes in the same manner as described above.

The through-holes (fine holes) are formed according to a method of forming through-holes using an etching method or a method of forming through-holes using a punch. Moreover, in a case where the number of fine holes is small, the fine holes may be formed by performing laser processing.

(Light Source)

The light source 14 may be a point light source such as a light emitting diode (LED) or a line light source such as rod-like fluorescent light. Further, various known light sources which have been used for direct backlight units of the related art can be used as the light source. The light source 14 is disposed on the reflection surface 12a side of the rear-side reflective plate 12. In a case where the light source 14 is a point light source, a plurality of point light sources may be arranged in a two-dimensional array. Further, in a case where the light source 14 is a line light source, a plurality of line light sources may be arranged in a direction orthogonal to the longitudinal direction.

(Rear-Side Reflective Plate)

The rear-side reflective plate 12 is not limited as long as the rear-side reflective plate 12 has the reflection surface 12a that reflects light L emitted from the light source 14, and various known reflective plates which have been used for direct backlight units of the related art can be used as the rear-side reflective plate. In order to efficiently use light, it is preferable that the rear-side reflective plate has a reflection surface that has a low absorption and a high reflectivity. The depolarization degree may be high or low. For example, white PET is suitable, but the plate is not limited thereto.

(Circular Polarization Reflection Film)

According to the present embodiment, the circular polarization reflection film 30 is formed of a combination of the λ/4 film 32 and the linearly polarized light reflection film 34 which are disposed in order from the perforated reflective plate 20 side as described above. Alternatively, as in a backlight unit 10A illustrated as a design change example in FIG. 3, a circular polarization reflection film 35 may be formed of a combination of a circular polarization separation film 36 and a λ/4 film 38 which are disposed in order from the perforated reflective plate 20 side.

The λ/4 film 32 and the linearly polarized light reflection film 34 that constitute the circular polarization reflection film 30 will be described.

As the linearly polarized light reflection film 34, known films can be appropriately used as long as the film transmits the first linearly polarized light $L_1$ which is linearly polarized light in a predetermined direction and reflects the second linearly polarized light $L_2$ which is orthogonal to the first linearly polarized light $L_1$.

Similarly, the λ/4 film 32 is not particularly limited, and a known λ/4 plate can be used as the film. Further, the λ/4 plate is typically configured of a support and a λ/4 layer formed on the support, but may be configured of only a λ/4 layer obtained by coating a support with a λ/4 layer and then removing the support from the layer. Further, the λ/4 plate may be formed by directly coating the perforated reflective plate 20 or the linearly polarized light reflection film 34 with a λ/4 layer. In a case where the perforated reflective plate 20 or the linearly polarized light reflection film 34 is directly coated with a λ/4 layer, the entire thickness of the backlight unit can be reduced.

The circular polarization separation film 36 and the λ/4 film 38 which constitute the circular polarization reflection film 35 will be described.

Various known films can be used as the circular polarization separation film 36 as long as the film reflects predetermined circular polarization and transmits circular polarization other than the predetermined light.

For example, circular polarization separation plates described in JP1997-133810A (JP-H09-133810A), JP3591699B, and WO2015/029958A can be used. The preferable ranges of the liquid crystal compounds to be used are the same as those described in WO2015/029958A.

Specifically, the circular polarization separation film 36 is formed as follows.

It is preferable that the circular polarization separation film 36 is formed using a liquid crystal material. Further, in a case where the circular polarization separation film 36 is formed using a liquid crystal material, it is preferable that the circular polarization separation film is formed by coating the surface of an alignment film with a coating solution and curing the surface using a support having a surface provided with an alignment film.

In addition, the circular polarization reflection film 35 may be formed by forming an alignment film on a support, forming the λ/4 film 38 on the alignment film, and directly coating the λ/4 film 38 with the circular polarization separation film 36.

As an example, the circular polarization separation film 36 may be formed using a liquid crystal material having a cholesteric structure.

(Cholesteric structure)

The cholesteric structure is known to exhibit selective reflection properties at a specific wavelength. A central wavelength λ of selective reflection depends on a pitch (period of a helix) of a helical structure in the cholesteric structure and follows a relationship of "λ=n×P" which is the relationship between an average refractive index n and the central wavelength λ. Accordingly, the selective reflection wavelength can be adjusted by adjusting the pitch of this helical structure. Since the pitch of the cholesteric structure depends on the type of a chiral agent used together with a polymerizable liquid crystal compound during the formation of the circular polarization separation film 36 or the addition concentration thereof, a desired pitch can be obtained by adjusting these. Further, the adjustment of the pitch is described in detail in Fujifilm Research Report No. 50 (2005), p. 60 to 63. As a method of measuring the sense or the pitch of a helix, the methods described in "Introduction to Liquid Crystal Chemical Experiment" edited by The Japanese Liquid Crystal Society, published by Sigma Publishing (2007), p. 46 and "Liquid Crystal Handbook", edited by Liquid Crystal Handbook Editing Committee, Maruzen-Yushodo Company, Ltd., p. 196 can be used.

The cholesteric structure shows a striped pattern formed of bright portions and dark portions in a cross-sectional image showing the circular polarization separation film 36 measured using a scanning electron microscope (SEM). Two repetitions of bright portions and dark portions (two bright portions and two dark portions) correspond to one pitch of a helix. Based on this, the pitch can be measured using a cross-sectional SEM image. Each normal line of the striped pattern is a helical axis direction.

Figure 3:
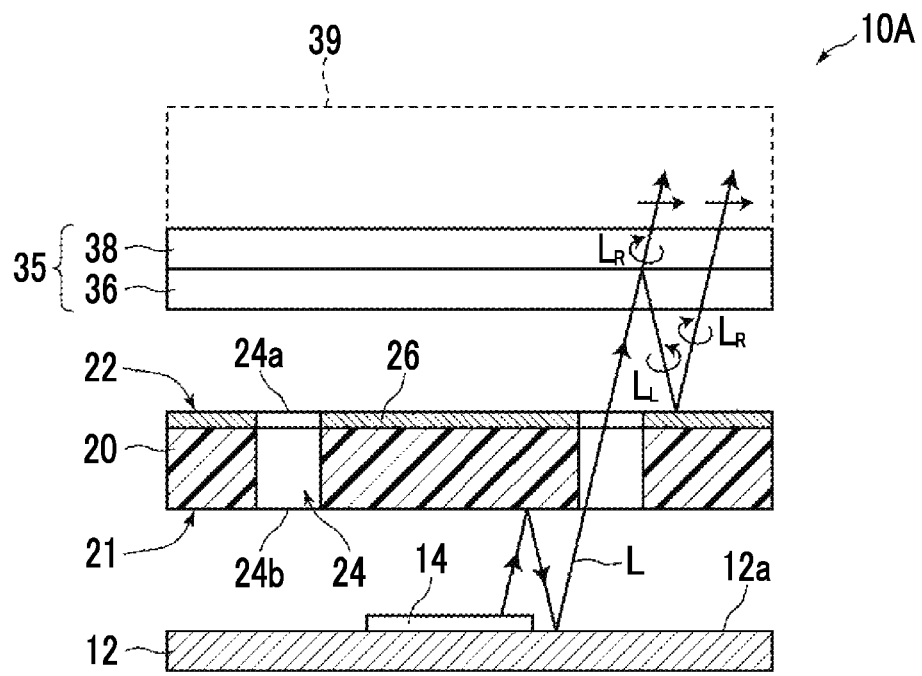
FIG. 3 is a schematic cross-sectional view illustrating a design change example of the backlight unit according to the first embodiment of the present invention.

Further, reflected light of the cholesteric structure is circular polarization. In other words, the reflected light of the circular polarization separation film 36 is circular polarization as described above. Whether the reflected light is right circular polarization or left circular polarization depends on the twisted direction of the helix in the cholesteric structure. In the selective reflection caused by the cholesteric structure, right circular polarization is reflected in a case where the twisted direction of the helix in the cholesteric structure is right and left circular polarization is reflected in a case where the twisted direction of the helix is left. In the example of FIG. 3, left circular polarization is reflected.

As the circular polarization separation film 36, any of a right twisted cholesteric liquid crystal and a left twisted cholesteric liquid crystal may be used. Further, the direction of revolving a cholesteric liquid crystalline phase can be adjusted depending on the type of a liquid crystal compound or the type of a chiral agent to be added.

In a half-width Δλ (nm) of a selective reflection band (circular polarization reflection band) showing the selective reflection, Δλ depends on a pitch P and a birefringence Δn of a liquid crystal compound and follows a relationship of Δλ=Δn×P. Accordingly, the width of the selective reflection band can be controlled by adjusting Δn. Further, Δn can be adjusted by adjusting the type of a polymerizable liquid crystal compound or a mixing ratio thereof or controlling the temperature at the time of alignment fixation.

The half-width of a reflection wavelength range is adjusted depending on the performance or the like required for a backlight unit. The half-width of the reflection wavelength range may be, for example, in a range of 50 to 500 nm and preferably in a range of 100 to 300 nm.

In FIG. 3, the circular polarization separation film 36 is illustrated as one layer. However, the circular polarization separation film 36 may have a multilayer configuration.

For example, the circular polarization separation film 36 that reflects left circular polarization $L_L$ and transmits right circular polarization $L_R$ may have a configuration of three layers consisting of a layer which corresponds to red light (R light), reflects left circular polarization of $L_L$ of red light, and transmits light other than the left circular polarization $L_L$ of red light; a layer which corresponds to green light (G light), reflects left circular polarization $L_L$ of green light, and transmits light other than the left circular polarization $L_L$ of green light; and a layer which corresponds to blue light (B light), reflects left circular polarization $L_L$ of blue light, and transmits light other than the left circular polarization $L_L$ of blue light.

Alternatively, the circular polarization separation film 36 that reflects left circular polarization $L_L$ and transmits right circular polarization $L_R$ may have a configuration of two layers consisting of a layer which corresponds to R light and G light, reflects left circular polarization $L_L$ of red and green light, and transmits light other than the left circular polarization $L_L$ of red and green light; and a layer which corresponds to blue light (B light), reflects left circular polarization $L_L$ of blue light, and transmits light other than the left circular polarization $L_L$ of blue light.

Alternatively, the circular polarization separation film 36 that reflects left circular polarization $L_L$ and transmits right circular polarization $L_R$ may have a configuration of two layers consisting of a layer which corresponds to R light, reflects left circular polarization $L_L$ of red light, and transmits light other than the left circular polarization $L_L$ of red light; and a layer which corresponds to green light and blue light, reflects left circular polarization $L_L$ of green and blue light, and transmits light other than the left circular polarization $L_L$ of green and blue light.

In the circular polarization separation film 36 having such a multilayer configuration, layers with respective colors may be laminated in any order.

The layers corresponding to respective colors of R light, G light, and B light can be formed by adjusting the helical pitch in the cholesteric structure of the liquid crystal material forming the circular polarization separation film 36. Further, the helical pitch in the cholesteric structure can be adjusted by, for example, selecting the type of chiral agent or the addition concentration of the chiral agent.

The circular polarization separation film 36 having such a multilayer structure can be prepared by applying and curing a liquid crystal composition which becomes the first layer to form the first layer and applying a liquid crystal composition which becomes the second layer onto the first layer and curing the layer to form the second layer, in a case of the two-layer configuration. Further, the third and subsequent layers can be formed according to the same method as described above.

The circular polarization reflection film 35 has a configuration in which the λ/4 film 38 is provided on the light emission side of the circular polarization separation film 36. As described above, the circular polarization reflection film 35 may be a laminated film formed by directly coating the λ/4 film 38 with the circular polarization separation film 36 or a laminated film formed by adhering the circular polarization separation film 36 and the λ/4 film 38, which have been separately prepared, to each other using a pressure sensitive adhesive layer. In a case where the circular polarization separation film 36 and the λ/4 film 38 are disposed in this order from the perforated reflective plate 20 side, the both films 36 and 38 may not be allowed to adhere to each other or may not be brought into contact with each other. As the λ/4 film 38, for example, a known λ/4 plate such as a λ/4 plate obtained by forming an alignment film on a support and forming an optically anisotropic layer that contains a liquid crystal compound on the alignment film or a λ/4 plate obtained by laminating a retardation film can be used.

The right circular polarization LR which has been transmitted through the circular polarization separation film 36 is converted into linearly polarized light corresponding to the backlight-side polarizing plate 39 by the λ/4 film 38 and then emitted from the emission surface side of the λ/4 film 38 (that is, the circular polarization reflection film 35).

Since the backlight unit 10 of the present embodiment described above and the backlight unit 10A of the design change example respectively include the perforated reflective plate 20 and the depolarization degree of the emission-side reflection surface 22 is 60% or less, the depolarization of predetermined circular polarization reflected by the circular polarization reflection film 30 or 35 is suppressed, the orientation of the polarized light is reversed by the emission-side reflection surface 22, and a large quantity of reflected light components can be allowed to be incident on the circular polarization reflection film 30 again as the circular polarization having an orientation of being transmitted through the circular polarization reflection film 30. An increase in stray light generated in a case where the reflection of reflected light is repeated several times can be suppressed, reuse of the reflected light can be efficiently performed, and the effect of improving the luminance can be sufficiently obtained.

According to the present embodiment of the present invention, since the backlight unit 10 does not include a diffusion plate disposed on the emission surface of a direct backlight unit of the related art, depolarization of reflected light can be suppressed. Further, a backlight unit that includes a prism sheet disposed between a diffusion plate and a polarized light reflective plate for the purpose of improving the luminance has been suggested in the related art, but the depolarization degree of polarized light is increased in a case where a prism sheet is used so that the utilization efficiency of reflected light is decreased. Meanwhile, the backlight unit of the present invention does not include a prism sheet or a diffusion plate that increases the depolarization degree of polarized light reflected by the reflective polarizer, and thus the depolarization degree of the reflection surface of polarized light is 60% or less, which is small, and the state of polarized light can be maintained. Therefore, polarized light reflected by the circular polarization reflection film can be efficiently used.

Figure 4:
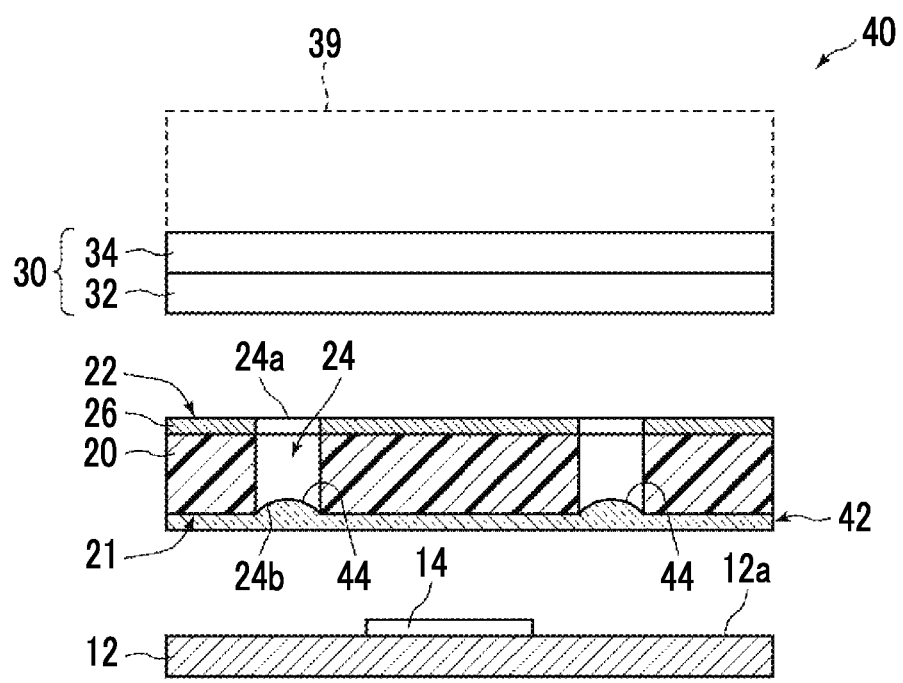
FIG. 4 is a schematic cross-sectional view schematically illustrating the configuration of a backlight unit according to a second embodiment of the present invention.

FIG. 4 is a schematic cross-sectional view schematically illustrating the configuration of a backlight unit 40 according to the second embodiment. The same elements as in the backlight unit 10 according to the first embodiment illustrated in FIG. 1 are denoted by the same reference numerals and the detailed description thereof will not be provided. The same applies hereinafter.

As illustrated in FIG. 4, the backlight unit 40 of the present embodiment is different from the first backlight unit 10 in terms that a lens sheet 42 is provided on the light source-side reflection surface 21 of the perforated reflective plate 20. The lens sheet 42 is a sheet member having a plurality of lens portions 44 on the surface thereof and is bonded to the light source-side reflection surface 21 such that each lens portion 44 is positioned in the opening 24b of the fine hole 24 on the light source side in the perforated reflective plate 20. In a case where the opening 24b has the lens portion 44, the directivity of light, to be incident to the opening 24b, toward the circular polarization reflection film 30 can be increased and thus the front luminance can be improved.

In FIG. 4, the lens sheet 42 in which one lens portion 44 is provided in one fine hole 24 is illustrated, but a lens sheet formed by two-dimensionally arranging a plurality of lens portions in a larger number than the number of fine holes 24 may be used. The lens sheet 42 may be allowed to adhere to the light source-side reflection surface 21 of the perforated reflective plate 20 through a pressure sensitive adhesive.

<Method of Producing Lens Sheet and Adhesion Method>

The lens sheet 42 is not particularly limited as long as the lens sheet is a film having an optical lens. In FIG. 4, the lens portion 44 has a convex shape, but may have a concave shape in a case where the lens portion has a function of converging light on the emission side of the perforated reflective plate 20. From the viewpoint of excellent productivity of the lens sheet 42, it is preferable that the lens portion 44 has a convex shape. As the lens sheet, for example, a lens film described in JP2015-49363A can be suitably used.

Examples of the shape of the lens portion 44 include a spherical segment shape (shape formed by cutting a sphere out with a plane), a spherical segment stand shape (shape formed by cutting a sphere with two planes in parallel with each other), an ellipsoidal spherical segment shape (shape formed by cutting a revolving ellipsoid out with one plane), an ellipsoidal spherical segment stand shape (shape formed by cutting a revolving ellipsoid out with two planes in parallel with each other), a pyramid shape, a truncated pyramid shape, a conical shape, a truncated cone shape, a Fresnel shape, a diffraction lattice shape, a prism shape, and a cylindrical shape. These shapes of the lens portions 44 may be used alone or in combination of two or more kinds thereof. Among the shapes of the lens portions 44, from the viewpoint of excellent luminance, a spherical segment shape, a spherical segment stand shape, an ellipsoidal spherical segment shape, an ellipsoidal spherical segment stand shape, a pyramid shape, a truncated pyramid shape, a conical shape, and a truncated cone shape are preferable; and a spherical segment shape, an ellipsoidal spherical segment shape, a pyramid shape, and a truncated pyramid shape are more preferable.

In a case where the shape of the lens portion 44 is a spherical segment shape, a spherical segment stand shape, an ellipsoidal spherical segment shape, an ellipsoidal spherical segment stand shape, a pyramid shape, a truncated pyramid shape, a conical shape, or a truncated cone shape, the aspect ratio of the lens portion 44 is preferably in a range of 0.3 to 1.4, more preferably in a range of 0.35 to 1.3, and still more preferably in a range of 0.4 to 1.0 from the viewpoint of excellent luminance. Further, the aspect ratio of the lens portion 44 is set as a ratio of the height of the lens portion 44 to the longest diameter of the bottom portion of the lens portion 44.

From the viewpoint of excellent luminance, the height of the lens portion 44 is preferably in a range of 0.25 to 75 µm, more preferably in a range of 0.5 to 65 µm, and still more preferably in a range of 1 to 50 µm.

In the present specification, the height of the lens portion 44 indicates the height from the flat surface of the sheet on which the lens portion 44 is provided to the highest portion (vertex) of the lens portion 44 in a case of the convex structure. Further, the height thereof indicates the depth from the flat surface of the sheet on which the lens portion 44 is provided to the lowest portion in a case of the concave structure. In addition, the height of the lens portion 44 is obtained by imaging the cross section of the lens sheet 42 using a scanning electron microscope, measuring the height of each lens portion 44 at five sites, and acquiring the average value thereof.

From the viewpoint of excellent luminance, the pitch of the lens portions 44 is preferably in a range of 0.5 to 150 µm, more preferably in a range of 1 to 130 µm, and still more preferably in a range of 2 to 100 µm.

In the present specification, the pitch of the lens portions 44 indicates the shortest distance between the highest portions or the lowest portions of the lens portions 44. The pitch of the lens portions 44 is obtained by imaging the surface of the lens sheet 42 having the lens portions 44 using a scanning electron microscope, measuring the shortest distance between the highest portions or the lowest portions of the lens portions 44 at five sites, and acquiring the average value thereof.

Examples of the shapes of the bottom portions (portions on the flat surface) of the lens portions 44 include a quadrangle such as a square or a rectangle; a circle; and an ellipse. The shapes of the bottom portions of the lens portions 44 may be used alone or in combination of two or more kinds thereof. Among the shapes of the bottom portions of the lens portions 44, from the viewpoint of excellent luminance, a quadrangle, a circle, and an ellipse are preferable; and a square, a rectangle, and a circle are more preferable.

In the present specification, the bottom portion of the lens portion 44 indicates a virtual planar portion enclosed by the outer peripheral edge on the flat surface of the sheet on which the lens portion 44 is formed.

The resin in the material of the lens sheet 42 is not particularly limited as long as the resin has cleared a solvent resistance test and has a high light transmittance in a visible light wavelength range (approximately 400 to 700 nm), and examples thereof include an acrylic resin; a polycarbonate resin; a polyester resin such as polyethylene terephthalate, polybutylene terephthalate, or polyethylene naphthalate; a styrene resin such as polystyrene or an acrylonitrile-butadiene-styrene copolymer (ABS) resin; and a vinyl chloride resin. Among these resins, from the viewpoints of a high light transmittance in a visible light wavelength range and excellent solvent resistance, heat resistance, mechanical characteristics, and forming processability, an acrylic resin is preferable.

From the viewpoint of excellent luminance, the refractive index of the resin in the material of the lens sheet 42 is preferably in a range of 1.40 to 2.00, more preferably in a range of 1.43 to 1.95, and still more preferably in a range of 1.46 to 1.90.

From the viewpoints of excellent light-transmitting properties of the lens sheet 42 and excellent luminance, the content of the resin in the material of the lens sheet 42 is preferably 90% by mass or greater, more preferably 95% by mass or greater, still more preferably 97% by mass or greater, and particularly preferably 99% by mass or greater.

The material of the lens sheet 42 may contain components other than the resin within the range not damaging the performance of the lens sheet 42. Examples of the other components include light diffusing fine particles, a release agent, a flame retardant, an antistatic agent, a leveling agent, an antifouling property improving agent, a dispersion stabilizer, and a viscosity-adjusting agent.

From the viewpoint of suppressing degradation of the performance of the lens sheet 42, the content of other components in the material of the lens sheet 42 is preferably 10% by mass or less, more preferably 5% by mass or less, still more preferably 3% by mass, and particularly preferably 1% by mass or less.

As a method of producing the lens sheet 42, a production method of supplying an active energy ray curable composition to a region between a base material and a mold formed by arranging a plurality of transfer portions having a reversed structure of the lens portion 44 and irradiating the region between the mold and the base material with active energy rays may be exemplified.

Examples of a light emitting source of active energy rays include a chemical lamp, a low-pressure mercury lamp, a high-pressure mercury lamp, a metal halide lamp, an electrodeless ultraviolet lamp, a visible light halogen lamp, and a xenon lamp.

The integrated light quantity of the active energy rays may be appropriately set according to the type of the active energy ray curable composition, but is preferably in a range of 0.01 to 10 $J/cm^2$ and more preferably in a range of 0.5 to 8 $J/cm^2$ from the viewpoints of excellent curability of the active energy ray curable composition and suppressing degradation of the lens sheet 42.

Figure 5:
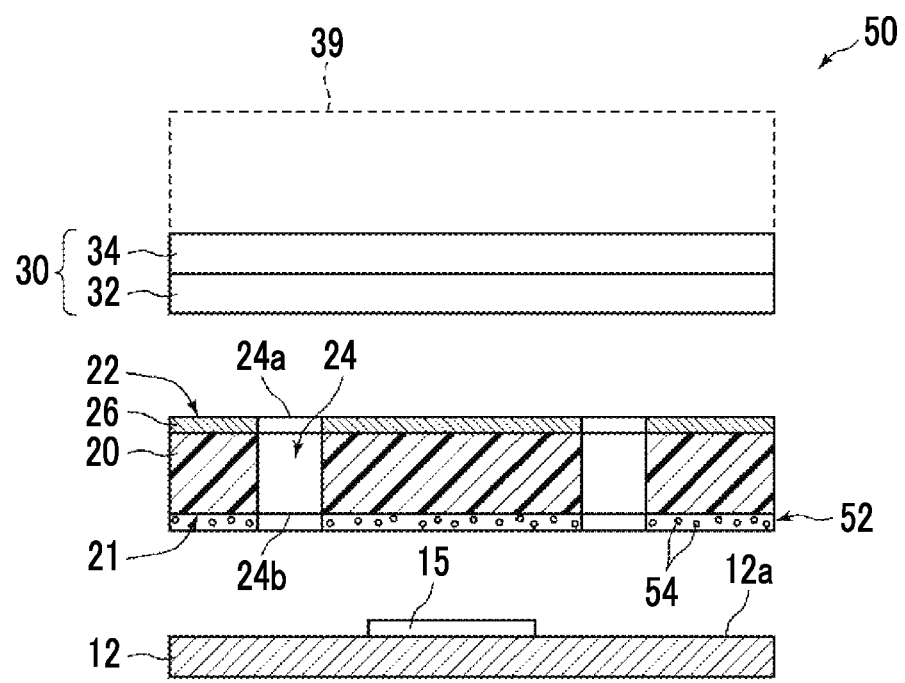
FIG. 5 is a schematic cross-sectional view schematically illustrating the configuration of a backlight unit according to a third embodiment of the present invention.

FIG. 5 is a schematic cross-sectional view schematically illustrating the configuration of a backlight unit 50 according to a third embodiment.

The backlight unit 50 of the present embodiment is different from the backlight unit 10 of the first embodiment illustrated in FIG. 1 in terms that a wavelength conversion layer 52 which is excited by the incidence ray and generates light having a wavelength different from the wavelength of the incidence ray is provided on the light source-side reflection surface 21 of the perforated reflective plate 20. Further, the backlight unit 50 is different from the backlight unit 10 of the first embodiment illustrated in FIG. 1 in terms that a light source 15 that emits an incidence ray having an excitation wavelength of the wavelength conversion layer 52 is provided. Except for these points, the backlight unit 50 is the same as the backlight unit 10 and exerts the same effects as those of the backlight unit 10.

The wavelength conversion layer 52 may be directly formed on the light source-side reflection surface 21, but may be separately prepared to have a sheet shape and then allowed to adhere onto the light source-side reflection surface 21 through a pressure sensitive adhesive.

The wavelength conversion layer 52 converts the wavelength of the incidence ray into a relatively long wavelength. The wavelength conversion layer 52 contains a wavelength conversion material 54 which is excited by the incidence ray of a fluorescent body, a quantum dot, or a combination of these and generates light having a wavelength different from that of the incidence ray.

The fluorescent body may typically be an organic fluorescent body or an inorganic fluorescent body. According to an exemplary embodiment, the fluorescent body may be a yellow fluorescent body. Such a yellow fluorescent body may be a YAG-based fluorescent material, a silicate-based fluorescent material, an oxynitride fluorescent material, or a combination of these, but is not limited to these.

The quantum dot has a size of several nanometers to several tens of nanometers as a semiconductor nanoparticle having a core-shell structure and has a characteristic of emitting light having different wavelengths according to the size of particle due to the quantum confinement effect. More specifically, the quantum dot generates intense light in a narrow wavelength band, and light diverging from the quantum dot is generated at the time of transition of an electron in an excited state to a valence band from a conduction band. At this time, the quantum dot has a property in which light having a short wavelength is generated as the particle of the quantum dot is as small as possible and light having a long wavelength is generated as the particle thereof. Accordingly, by adjusting the size of the quantum dot, entire light in a visible light range having a desired wavelength can be emitted.

The quantum dot may contain any one nanocrystal from among a Si-based nanocrystal, a Group II-VI compound semiconductor nanocrystal, a Group III-V compound semiconductor nanocrystal, a Group IV-VI compound semiconductor nanocrystal, and a mixture of these.

The Group II-VI compound semiconductor nanocrystal may be any one of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

Further, the Group III-V compound semiconductor nanocrystal may be any one of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs; and the Group IV-VI compound semiconductor nanocrystal may be SbTe.

The wavelength conversion layer 52 may contain one kind of quantum dots. For example, the wavelength conversion layer 52 may contain yellow quantum dots converting the wavelength of the incidence ray into a wavelength of yellow light. However, the kind of quantum dots to be contained therein is not limited thereto, and the wavelength conversion layer 52 may contain two or more kinds of quantum dots. For example, the wavelength conversion layer 52 may contain red quantum dots converting the wavelength of the incidence ray into a wavelength of red light and green quantum dots converting the wavelength of the incidence ray into a wavelength of green light.

The wavelength conversion layer 52 may further contain a dispersion medium that disperses wavelength conversion materials other than the wavelength conversion material 54 such as a fluorescent body or quantum dots. In other words, the fluorescent body or quantum dots can be dispersed in the form of being naturally coordinated to a dispersion medium such as an organic solvent or a polymer resin. As such a dispersion medium, any medium can be used as long as the medium is transparent within the range not impacting the wavelength conversion performance of the fluorescent body or quantum dots, not reflecting light, and not causing light absorption.

The organic solvent may contain at least one of toluene, chloroform, or ethanol, and the polymer resin may contain at least one of epoxy, silicone, polystyrene, or acrylate.

Further, the wavelength conversion layer 52 may further contain a UV initiator, a thermosetting additive, a crosslinking agent, a diffusing agent, and a combination of these other than the dispersion medium.

The backlight unit 50 of the present embodiment may include a blue LED as the light source 15 and a wavelength conversion layer 52 formed by dispersing quantum dots which are excited by blue light and emit green light and quantum dots which are excited by blue light and emit red light in a matrix.

In addition, the wavelength conversion layer 52 may be interposed between two sheets of barrier films that suppress transmission of oxygen and moisture.

Hereinbefore, the backlight unit of the present invention has been described in detail, but the present invention is not limited to the above-described examples, and various improvements or modifications can also be made within the range not departing from the scope of the present invention.

EXAMPLES

Hereinafter, the present invention will be described in more detail with reference to examples. The materials, the reagents, the use amounts, the amounts of materials, the ratios, the treatment contents, and the treatment procedures shown in the examples described below can be changed as appropriate within the range not departing from the gist of the present invention. Therefore, the scope of the present invention should not be limitatively interpreted by the following specific examples.

Example 1

A preparation method of Example 1 will be described. First, a rear-side reflective plate was obtained by adhering white polyethylene terephthalate (hereinafter, white PET) formed by mixing a white pigment into polyethylene terephthalate (PET) having a thickness of 100 μm to an acrylic plate having a thickness of 2 mm. The white PET surface constitutes the reflection surface.

Using a white LED light source as a light source, a plurality of light sources were arranged on the white PET surface of the rear-side reflective plate at intervals of 5 cm×5 cm (intervals of 5 cm in length and width).

A direct backlight unit of Example 1 was prepared by interposing a spacer between the rear-surface reflective plate and a perforated reflective plate 1A such that an interval of 1.5 cm was made therebetween, disposing the perforated reflective plate 1A described below, and disposing a circular polarization reflection film 1 described below on the opposite side of the light source of the perforated reflective plate 1A.

—Perforated reflective plate 1A—

White PET having a thickness of 100 μm which was the same as that of the rear-side reflective plate was prepared. A silver reflection film 1 was prepared by forming a silver thin film layer having a thickness of 80 nm on one surface of a PET film having a thickness of 25 μm as a metal reflection layer according to a vacuum deposition method.

The silver reflection film 1 was allowed to adhere to one surface of the white PET such that the PET film side became one surface side of the white PET using a pressure sensitive adhesive (SK-DYNE (registered trademark) 2057, manufactured by Soken Chemical & Engineering Co., Ltd.). In this manner, a double-sided reflective plate provided with one surface functioning as a mirror surface formed of a silver thin film layer and having a small depolarization degree and the other surface functioning as a reflection surface formed of white PET and having a large diffusion and a large depolarization degree was obtained.

A plurality of through-holes (fine holes) were formed in this double-sided reflective plate using a hollow punch having a diameter of 1 mm. The plurality of fine holes were formed by adjusting the number of the fine holes such that the opening ratio thereof was set to 10%. Since the luminance in the portion directly above the light source was extremely high, holes were formed by adjusting the interval between the holes such that the interval was widened in the vicinity of the light source and the luminance distribution became uniform in the plane.

The perforated reflective plate 1A prepared in the above-described manner was disposed such that the surface of the silver thin film layer was set as a viewing side and the surface of the white PET was set as a light source side. Further, the reflectivity of the surface of the silver thin film layer in the silver reflection film 1 was 99% and the depolarization degree was 4%. Further, the reflectivity of the surface of the white PET was 99% and the depolarization degree was 95%. The reflectivity and the depolarization degree of both surfaces were measured in the state before the fine holes were formed. The reflectivity and the depolarization degree were measured according to the above-described measuring method. The same applies to the following examples.

—Circular Polarization Reflection Film 1—

The circular polarization reflection film 1 was formed of a λ/4 film and a linearly polarized light reflection film. Both films were allowed to adhere to each other using a pressure sensitive adhesive such that the angle between the transmission axis of the linearly polarized light reflection film and the slow axis of the 214 film was set to 45°, thereby preparing a circular polarization reflection film 1.

Here, a QL film (manufactured by Fujifilm Corporation) was used as the λ/4 film. As the linearly polarized light reflection film, an iPad Air (registered trademark) (manufactured by Apple Inc.) was disassembled and a film used as a luminance improvement film was taken out and then used.

The circular polarization reflection film 1 was disposed such that the λ/4 film was on the perforated reflective plate side.

Example 2

A perforated reflective plate 2A was used in place of the perforated reflective plate 1A of Example 1. A backlight unit of Example 2 was prepared in the same manner as in Example 1 except that the perforated reflective plate 2A was used.

—Perforated reflective plate 2A—

The perforated reflective plate 2A was prepared in the same manner as that for the perforated reflective plate 1A except that a silver reflection film 2 was used in place of the silver reflection film 1.

The silver reflection film 2 was obtained by coating one surface of a PET film having a thickness of 25 μm with a mixture formed by mixing 4% by mass of transparent fine particles, having a particle diameter of 6 μm and being formed of an urethane-based resin, into a polyester urethane-based resin according to a gravure coating method, preparing an uneven layer on the surface thereof, and forming a silver thin film layer having a thickness of 80 nm as a metal reflection layer according to a vacuum deposition method. Further, the reflectivity of the surface of the silver thin film layer in the silver reflection film 2 was 99% and the depolarization degree was 30%.

Example 3

A perforated reflective plate 3A was used in place of the perforated reflective plate 1A of Example 1. A backlight unit of Example 3 was prepared in the same manner as in Example 1 except that the perforated reflective plate 3A was used.

—Perforated reflective plate 3A—

The perforated reflective plate 3A was prepared in the same manner as that for the perforated reflective plate 1A except that a silver reflection film 3 was used in place of the silver reflection film 1.

The silver reflection film 3 was obtained by coating one surface of a PET film having a thickness of 25 μm with a mixture formed by mixing 15% by mass of transparent fine particles, having a particle diameter of 6 μm and being formed of an urethane-based resin, into a polyester urethane-based resin according to a gravure coating method, preparing an uneven layer on the surface thereof, and forming a silver thin film layer having a thickness of 80 nm as a metal reflection layer according to a vacuum deposition method. Further, the reflectivity of the surface of the silver thin film layer in the silver reflection film 3 was 99% and the depolarization degree was 60%.

Example 4

A perforated reflective plate 1B which had the same configuration as that of the perforated reflective plate 1A of Example 1 and fine holes with an opening ratio of 25% was used. A backlight unit of Example 4 was prepared in the same manner as in Example 1 except that the perforated reflective plate 1B was used.

Example 5

A perforated reflective plate 2B which had the same configuration as that of the perforated reflective plate 2A of Example 2 and fine holes with an opening ratio of 25% was used. A backlight unit of Example 5 was prepared in the same manner as in Example 1 except that the perforated reflective plate 2B was used.

Example 6

A perforated reflective plate 1C which had the same configuration as that of the perforated reflective plate 1A of Example 1 and fine holes with an opening ratio of 50% was used. A backlight unit of Example 6 was prepared in the same manner as in Example 1 except that the perforated reflective plate 1C was used.

Example 7

A perforated reflective plate 1D having a thickness of 600 μm was prepared by adhering five sheets of white PET having a thickness of 100 μm to one another using a pressure sensitive adhesive (SK-DYNE (registered trademark) 2057, manufactured by Soken Chemical & Engineering Co., Ltd.) having a thickness of 25 μm in the perforated reflective plate 1A of Example 1 and adhering the silver reflection film 1 onto one surface of the laminated white PET using the same pressure sensitive adhesive. A backlight unit of Example 7 was prepared in the same manner as in Example 1 except that the perforated reflective plate 1D was used. The perforated reflective plate 1D of the present example had a thickness t of 625 μm, the fine holes had an opening diameter d of 125 μm, and the thickness t and the opening diameter d satisfied an equation of "t/d=5".

Example 8

A backlight unit of Example 8 was prepared in the same manner as in Example 1 except that a lens sheet was attached to a surface of the perforated reflective plate 1A on the white PET side.

According to the procedures of preparing the perforated reflective plate 1A, a pressure sensitive adhesive (SK-DYNE (registered trademark) 2057, manufactured by Soken Chemical & Engineering Co., Ltd.) was allowed to adhere to the surface on the white PET side before fine holes were formed so that holes were formed in the pressure sensitive adhesive layer simultaneously with the formation of fine holes.

The lens sheet was prepared using an acrylic resin by referring to the method described in JP2015-49363A. The pitch of forming a lens in the lens sheet was 10 μm, and the shape of the lens was set as a circular shape in a plan view. As the base material of the lens sheet, an acrylic sheet having a thickness of 2 mm was used.

The lens sheet was allowed to adhere to the surface of the perforated reflective plate 1A on the white PET side such that the lens surface side was brought into close contact with the pressure sensitive adhesive layer. Since the uneven lens was filled with the pressure sensitive adhesive in the portion other than the fine holes, the condensing effect of the lens appeared only in the holes.

Example 9

A circular polarization reflection film 2 was used in place of the circular polarization reflection film 1 in Example 1. A backlight unit of Example 9 was prepared in the same manner as in Example 1 except that the circular polarization reflection film 2 was used.

—Circular Polarization Reflection Film 2—

The circular polarization reflection film 2 was configured to be formed of a λ/4 film and a cholesteric liquid crystal layer functioning as a circular polarization separation film.

—Preparation of Circular Polarization Reflection Film 2—

<<Preparation of Support Provided with Alignment Layer>>

<<Alkali Saponification Treatment of Cellulose Acylate Film Base Material>>

A long cellulose acylate film (TD40UL, manufactured by Fujifilm Corporation) was used as a support.

The support was allowed to pass through a dielectric heating roll at a temperature of 60° C. and the surface temperature of the film was increased to 40° C. Thereafter, one surface of the support was coated with an alkali solution having the following composition such that the coating amount thereof was set to 14 ml/m2 using a bar coater, and then the surface was heated to 110° C.

| (Alkali solution) | |
|---|---|
| Potassium hydroxide | 4.7 parts by mass |
| Water | 15.8 parts by mass |
| Isopropanol | 63.7 parts by mass |
| Surfactant ($C_{14}H_{29}O(CH_2CH_2O)_{20}H$) | 1 part by mass |
| Propylene glycol | 14.8 parts by mass |

The support coated with the alkali solution was transported for 10 seconds under a steam type far infrared heater (manufactured by NORITAKE CO., LTD.).

Next, the support was coated with 3 ml/m2 of pure water using a bar coater. Next, the support was washed with water using a fountain coater and dewatered using an air knife three times, transported to a drying zone at 70° C. for 10 seconds, and dried, thereby preparing a support (cellulose acylate film) having a surface subjected to an alkali saponification treatment.

<<<Formation of Alignment Layer>>>

The surface of the support, on which the alkali saponification treatment had been performed, was coated with an alignment layer coating solution having the following composition using a #14 wire bar.

| (Alignment layer coating solution) | |
|---|---|
| Modified polyvinyl alcohol described below | 10 parts by mass |
| Water | 371 parts by mass |
| Methanol | 119 parts by mass |
| Glutaraldehyde | 0.5 parts by mass |
| Photopolymerization initiator (IRGACURE (registered trademark) 2959) | 0.3 parts by mass |

(In the following structural formula, the proportion is a molar ratio.)

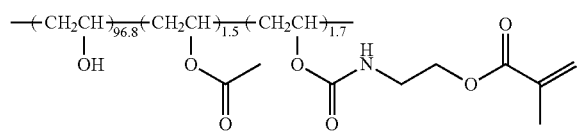

Modified polyvinyl alcohol

The applied alignment layer coating solution was dried by hot air at 60° C. for 60 seconds and further dried by hot air at 100° C. for 120 seconds.

A rubbing treatment was continuously performed on the obtained coated film, thereby preparing a support provided with an alignment layer. Further, the rubbing treatment was performed such that the longitudinal direction of the support was in parallel with the transport direction and a rotation axis of a rubbing roller was set in a direction of 45° clockwise with respect to the longitudinal direction of the support.

<<Preparation of Support Provided with λ/4 Film>>

A coating solution for forming a λ/4 film described below was prepared.

| (Coating solution for forming λ/4 film) | |
|---|---|
| Discotic liquid crystal compound (the following D1) | 80 parts by mass |
| Discotic liquid crystal compound (the following D2) | 20 parts by mass |
| Alignment assistant agent (the following OA1) | 0.9 parts by mass |
| Alignment assistant agent (the following OA2) | 0.1 parts by mass |
| Polymerization initiator (the following IN2) | 3 parts by mass |
| Methyl ethyl ketone (MEK) | 301 parts by mass |

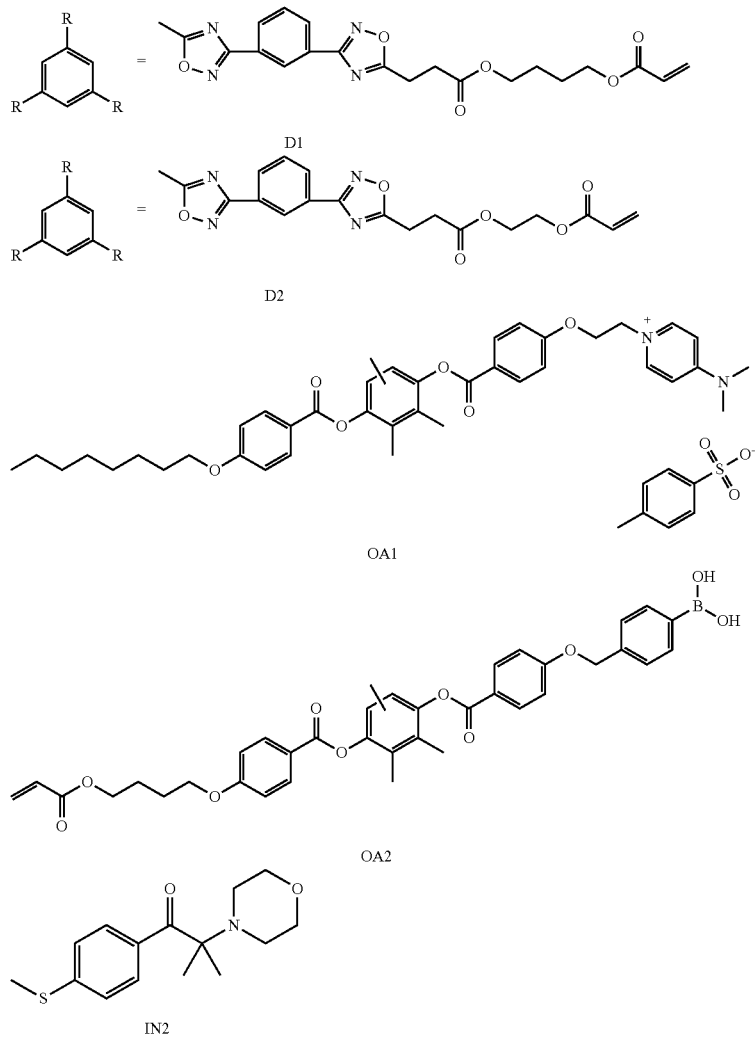

The alignment layer of the prepared support provided with an alignment layer was continuously coated with the coating solution for forming a λ/4 film using a #3.6 wire bar. The transport speed of the support was 20 m/min.

For the purpose of drying the solvent of the coating solution and alignment maturing of the discotic liquid crystal compound, the support was heated with hot air at 60° C. for 90 seconds. Next, ultraviolet ray emission (200 mJ/cm$^2$) was performed at 70° C., and the alignment of the liquid crystal compound was fixed to form a λ/4 film.

<<Preparation of Circular Polarization Separation Plate>>

A coating solution (D-IV) containing the following discotic liquid crystal compound was prepared.

| (Coating solution (D-IV) containing discotic liquid crystal compound) | |
|---|---|
| Discotic liquid crystal compound (D1 described above) | 80 parts by mass |

-continued

| (Coating solution (D-IV) containing discotic liquid crystal compound) | |
|---|---|
| Discotic liquid crystal compound (D2 described above) | 20 parts by mass |
| Chiral agent (the following CH4) | 3.8 parts by mass |
| Polymerization initiator (IRGACURE (registered trademark) 2959) | 5 parts by mass |
| Polymerization initiator (the following IN4) | 1 part by mass |
| Methyl ethyl ketone (MEK) | 189.9 parts by mass |
| tert-Butyl alcohol | 58.4 parts by mass |
| Cyclohexane | 43.8 parts by mass |

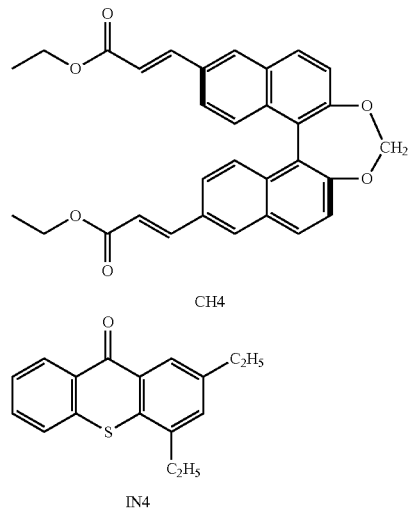

CH4

IN4

The λ/4 film of the prepared support provided with a λ/4 film was continuously coated with the coating solution (D-IV) containing a discotic liquid crystal compound using a #3.6 wire bar. The transport speed of the film was 20 m/min.

For the purpose of drying the solvent of the coating solution and alignment maturing of the discotic liquid crystal compound, the film was heated with hot air at 110° C. for 160 seconds. Next, ultraviolet ray emission (150 mJ/cm$^2$) was performed at 50° C. and the alignment of the liquid crystal compound was fixed, thereby preparing a first layer of a circular polarization separation film having a film thickness of 3 μm.

<<<Preparation of Optical Laminate (A)>>>

First, a terminal fluorinated alkyl group-containing polymer (compound A) having an optically active site was obtained by performing the procedures described in paragraph [0065] of JP4570377B. Specifically, a compound A was obtained as follows.

50 parts by mass of a fluorine-based solvent AK-225 (manufactured by ASAHI GLASS CO., LTD., a mixed solvent of 1,1,1,2,2-pentafluoro-3,3-dichloropropane and 1,1,2,2,3-pentafluoro-1,3-dichloropropane at a molar ratio of 1:1.35) and 5.22 parts by mass of a reactive chiral agent (a compound 7, the symbol "*" in the formula represents an optically active site) having optical activity with the following structure were put into a four-neck flask provided with a condenser, a thermometer, a stirrer, and a dropping funnel, the temperature of the reaction container was adjusted to 45° C., and 6.58 parts by mass of a 10 mass % solution of diperfluoro-2-methyl-3-oxahexanoyl peroxide/AK225 was added dropwise to the reaction container. After completion of the dropwise addition, the solution was allowed to react in a nitrogen stream at 45° C. for 5 hours, and the product was concentrated to 5 ml, re-precipitated with hexane, and dried, thereby obtaining 3.5 parts by mass (yield of 60%) of a terminal fluorinated alkyl group-containing polymer (compound A) having an optically active site.

The molecular weight of the obtained polymer was measured by gel permeation chromatography (GPC) using tetrahydrofuran (THF) as a developing solvent. As the result, Mn was 4,000 (Mw/Mn=1.77). Further, the fluorine content was measured, and the fluorine content was 5.89% by mass.

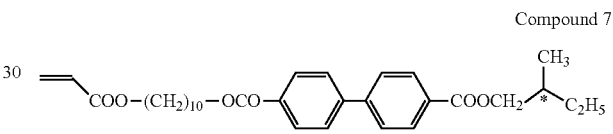

Compound 7

One surface of a long cellulose acylate film (TD80UL (manufactured by Fujifilm Corporation) having a size of 100 meters or greater was coated with an alignment film coating solution containing 10 parts by mass of polyvinyl alcohol and 371 parts by mass of water and dried, thereby forming an alignment film having a thickness of 1 μm. Next, a rubbing treatment was continuously performed on the alignment film in a direction parallel to the longitudinal direction of the film.

The alignment film was coated with a composition for forming a cholesteric liquid crystal layer (A) with the following composition using a bar coater, dried at room temperature for 10 seconds, heated (alignment maturing) in an oven at 100° C. for 2 minutes, and irradiated with ultraviolet rays for 30 minutes, thereby preparing an optical laminate (A) having a cholesteric liquid crystal layer (A) with a thickness of 5 μm.

| (Composition for forming cholesteric liquid crystal layer (A)) | |
|---|---|
| The following compound 8 | 8.2 parts by mass |
| Polymerization initiator (IN2 described above) | 0.3 parts by mass |
| Terminal fluorinated alkyl group-containing polymer (compound A) having optically active site prepared as described above | 1.9 parts by mass |
| Methyl ethyl ketone | 24 parts by mass |

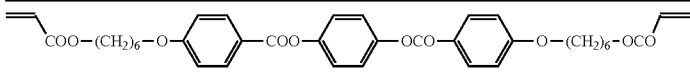

Compound 8

As the result of observation of a cross section of the cholesteric liquid crystal layer (A) using a scanning electron microscope, it was found that the layer had a helical axis in the layer normal direction and a structure in which the cholesteric pitch was continuously changed. Here, in regard to the cholesteric pitch, at the time of observation of the cross section of the cholesteric liquid crystal layer using a scanning electron microscope, the width of the layer formed by a bright part and a dark part being repeated two times (bright-dark-bright-dark) in the layer normal direction was counted as one pitch.

Further, in a case where the short wavelength side of the cholesteric pitch in the short thickness direction is defined as an x surface and the long wavelength side thereof is defined as a y surface, as the result of measurement of the cholesteric pitch using AXOSCAN (manufactured by Axometrics, Inc.), the cholesteric reflection wavelength in the vicinity of the x surface side was 500 nm and the cholesteric reflection wavelength in the vicinity of the y surface side was 700 nm.

From the viewpoints of manufacturing suitability and enabling preparation of an optical sheet member using a so-called roll-to-roll system, it is preferable to use a long cellulose acylate film. The long film to be used is not limited thereto as long as the cholesteric liquid crystal layer can be transferred.

The first layer of the circular polarization separation film prepared in the above-described manner and the optical laminate (A) were bonded by allowing the first layer and the cholesteric liquid crystal layer (A) to face each other using an acrylic UV curing adhesive according to a roll-to-roll system. Next, the cellulose acylate film was peeled off from the optical laminate (A) and only the cholesteric liquid crystal layer (A) was transferred onto the first layer to form a second layer of the circular polarization separation film. In this manner, a circular polarization reflection film 2 having a λ/4 film and a cholesteric layer on the support was obtained.

The circular polarization reflection film 2 was disposed such that the cholesteric liquid crystal layer was positioned on the perforated reflective plate side.

Comparative Example 1

A perforated reflective plate 1 formed of only white PET which was obtained by removing the silver reflection film 1 from the perforated reflective plate 1A in Example 1 was used. Since both surfaces of this perforated reflective plate 1 were white PET surfaces, the reflectivities of both surfaces were respectively 99% and the depolarization degrees thereof were respectively 95%. A backlight unit of Comparative Example 1 was prepared in the same manner as in Example 1 except that this perforated reflective plate 1 was used and the circular polarization reflection film in Example 1 was not provided.

Comparative Example 2

A backlight unit of Comparative Example 2 was prepared in the same manner as in Comparative Example 1 except that the linearly polarized light reflection film was disposed on the emission surface side (opposite side to the light source) of the perforated reflective plate 1 in the backlight unit of Comparative Example 1. As the linearly polarized light reflection film, similar to the film used in the circular polarization reflection film 1, an iPad Air (registered trademark) (manufactured by Apple Inc.) was disassembled and a film used as a luminance improvement film was taken out and then used.

Comparative Example 3

A perforated reflective plate 4 was used in place of the perforated reflective plate 1A in Example 1. A backlight unit of Comparative Example 3 was prepared in the same manner as in Example 1 except that the perforated reflective plate 4 was used.

—Perforated reflective plate 4—

The perforated reflective plate 4 was prepared in the same manner as that for the perforated reflective plate 1A except that a silver reflection film 4 was used in place of the silver reflection film 1.

The silver reflection film 4 was obtained by coating one surface of a PET film having a thickness of 25 µm with a mixture formed by mixing 20% by mass of transparent fine particles, having a particle diameter of 6 µm and being formed of an urethane-based resin, into a polyester urethane-based resin according to a gravure coating method, preparing an uneven layer on the surface thereof, and forming a silver thin film layer having a thickness of 80 nm as a metal reflection layer according to a vacuum deposition method. Further, the reflectivity of the surface of the silver thin film layer in the silver reflection film 4 was 99% and the depolarization degree was 70%.

Example 10

In the backlight unit of Example 1, a wavelength conversion member was provided on the white PET surface side of the perforated reflective plate 1A. Further, a backlight unit of Example 10 was prepared in the same manner as in Example 1 except that the wavelength conversion member was provided and a blue LED was used in place of the white LED as a light source.

—Wavelength Conversion Member—

The wavelength conversion member has a configuration in which a wavelength conversion layer is interposed between two barrier films.

The wavelength conversion member was prepared as follows.

<Preparation of Barrier Film>

An organic layer and an inorganic layer were sequentially formed on one surface side of a support by performing the following procedures using a polyethylene terephthalate film (PET film, trade name—COSMOSHINE (registered trademark), manufactured by TOYOBO Co., LTD., A4300, thickness of 50 µm) as a support.

Trimethylolpropane triacrylate (TMPTA, manufactured by Daicel-Cytec Co., Ltd.) and a photopolymerization initiator (ESACURE KT046, manufactured by Lamberti S.P.A.) were prepared, weighed such that the mass ratio between these was set to 95:5, and dissolved in methyl ethyl ketone to obtain a coating solution having a concentration of solid contents of 15% by mass. The above-described PET film was coated with this coating solution using a die coater according to a roll-to-roll system and was allowed to pass through a drying zone at an ambient temperature of 50° C. for 3 minutes. Thereafter, the film was irradiated (integrated irradiation quantity of approximately 600 mJ/cm$^2$) with ultraviolet rays in a nitrogen atmosphere, cured by ultraviolet curing, and wound up. The thickness of a first organic layer formed on the support was 1 µm.

Next, an inorganic layer (silicon nitride layer) was formed on a surface of the first organic layer using a chemical vapor deposition (CVD) device having a roll-to-roll system. Silane gas (flow rate of 160 sccm), ammonia gas (flow rate of 370 sccm), hydrogen gas (flow rate of 590 sccm), and nitrogen gas (flow rate of 240 sccm) were used as raw material gas. A high-frequency power source having a frequency of 13.56 MHz was used as a power source. The film forming pressure was 40 Pa and the ultimate thickness was 50 nm.

A laminated film obtained by laminating an inorganic layer on a surface of the first organic layer formed on the support was prepared in the above-described manner.

Further, a second organic layer was formed on a surface of the inorganic layer of the laminated film prepared in the above-described manner.

The second organic layer was prepared by weighing 5.0 parts by mass of a photopolymerization initiator (Irg184, manufactured by BASF SE) with respect to 95.0 parts by mass of an urethane bond-containing acrylate polymer (ACRIT 8BR930, manufactured by TAISEI FINE CHEMICAL CO, LTD.) and dissolving these in methyl ethyl ketone to obtain a coating solution having a concentration of solid contents of 15% by mass.

A surface of the inorganic layer of the laminated film was directly coated with this coating solution using a die coater according to a roll-to-roll system and was allowed to pass through a drying zone at an ambient temperature of 100° C. for 3 minutes. Thereafter, the laminated film coated with the coating solution and then dried was wound around a heat roller heated to a surface temperature of 60° C., irradiated (integrated irradiation quantity of approximately 600 mJ/cm$^2$) with ultraviolet rays to be cured, and wound up. The thickness of the second organic layer formed on the inorganic layer of the laminated film as described above was 1 μm.

In this manner, a barrier film having the first organic layer, the inorganic layer, and the second organic layer on the support in this order was prepared.

<Preparation of Coating Solution for Wavelength Conversion Layer>

The following quantum dot-containing polymerizable composition A was prepared, filtered using a polypropylene filter with a pore diameter of 0.2 μm, dried under reduced pressure for 30 minutes, and used as a coating solution for a wavelength conversion layer. The concentration of the quantum dot in the following toluene dispersion liquid was 1% by mass.

| Quantum dot-containing polymerizable composition A (coating solution for wavelength conversion layer) | |
|---|---|
| Toluene dispersion liquid of quantum dot 1 (maximum emission wavelength: 520 nm) | 10.0 parts by mass |
| Toluene dispersion liquid of quantum dot 2 (maximum emission wavelength: 620 nm) | 1.0 part by mass |
| Lauryl methacrylate | 80.8 parts by mass |
| Trimethylolpropane triacrylate | 18.2 parts by mass |
| Photopolymerization initiator (IRGACURE 819 (manufactured by BASF SE)) | 1.0 part by mass |

As the toluene solution of the quantum dot 1, a green quantum dot dispersion liquid CZ520-100 (manufactured by NN-LABS, LLC) having an emission wavelength of 520 nm was used. Further, as the toluene solution of the quantum dot 2, a red quantum dot dispersion liquid CZ620-100 (manufactured by NN-LABS, LLC) having an emission wavelength of 620 nm was used. These were both quantum dots in which CdSe was used as a core, ZnS was used as a shell, and octadecylamine was used as a ligand and dispersed in toluene at a concentration of 3% by mass.

<Preparation of Wavelength Conversion Member>

A wavelength conversion member formed by interposing a wavelength conversion layer between a first film and a second film was obtained by using the barrier films prepared by performing the above-described procedures as the first film and the second film. Specifically, a surface of the second organic layer was coated with the quantum dot-containing polymerizable composition A prepared in the above-described manner using a die coater while the first film was continuously transported at a tension of 1 m/min and then a tension of 60 N/m to form a coated film having a thickness of 50 μm. Next, the first film on which the coated film had been formed was wound around a backup roller, the second film was laminated on the coated film at an orientation at which the surface of the second organic layer was brought into contact with the coated film, and the laminate was continuously transported in a state in which the coated film was interposed between the first film and the second film and allowed to pass through a heating zone at 100° C. for 3 minutes. Thereafter, the laminate was irradiated with ultraviolet rays using an air-cooled metal halide lamp (manufactured by EYE GRAPHICS CO., LTD.) having a laser intensity of 160 W/cm, and the coated film of the quantum dot-containing polymerizable composition A was cured to form a wavelength conversion layer containing quantum dots. The irradiation quantity of ultraviolet rays was 2000 mJ/cm$^2$. The thickness of the wavelength conversion layer formed by being cured was approximately 50 μm. In this manner, a wavelength conversion member formed by interposing the wavelength conversion layer between two sheets of barrier films was obtained.

Further, in the present example, at the time of preparation of the perforated reflective plate 1A, the wavelength conversion member prepared in the above-described manner was allowed to adhere to a white PET surface side of a double-sided reflective plate using a pressure sensitive adhesive (SK-DYNE 2057, manufactured by Soken Chemical & Engineering Co., Ltd.) before fine holes were formed. In this manner, fine holes were formed on the double-sided reflective plate including the wavelength conversion member. Accordingly, holes were simultaneously provided in the wavelength conversion member.

Comparative Example 4

The perforated reflective plate 1 formed of only white PET obtained by removing the silver reflection film 1 from the perforated reflective plate 1A in Example 10 was used. A backlight unit of Comparative Example 4 was prepared in the same manner as in Example 10 except that the perforated reflective plate 1 was used and a linearly polarized light reflection film was used in the same manner as in Comparative Example 2 in place of the circular polarization reflection film in Example 10.

<Evaluation of Front Luminance>

The front luminance was measured and evaluated in the following manner with those prepared in the examples and comparative examples in the above-described manners.

A backlight portion in a commercially available liquid crystal display device (AL2216W, manufactured by Acer Incorporated) obtained by using twisted nematic (TN) type liquid crystal cells was replaced by those of Examples 1 to 10 and Comparative Examples 1 to 4. White display was performed using this liquid crystal display device and the luminance was measured in each display.

Specifically, the front luminance was measured in a state in which white display was performed by the liquid crystal display device of each example left in a room under conditions of 25° C. and 60% RH using a measuring device (EZ-Contrast 160D, manufactured by ELDIM Co., Ltd.).

The configurations and the evaluation results of Examples 1 to 9 and Comparative Examples 1 to 3 were collectively listed in Table 1. Further, the configurations and the evaluation results of Example 10 and Comparative Example 4 were collectively listed in Table 2.

The front luminance was evaluated as follows using the front luminance of Comparative example 2 as a reference in Table 1 and using the front luminance of Comparative example 4 as a reference in Table 2.

A: 140% or greater of the front luminance of the reference
B: 125% or greater and less than 140% of the front luminance of the reference
C: 115% or greater and less than 125% of the front luminance of the reference
D: 105% or greater and less than 115% of the front luminance of the reference
E: 95% or greater and less than 105% of the front luminance of the reference
F: less than 95% of the front luminance of the reference

TABLE 1

|  |  |  | Example 1 | Example 2 | Example 3 | Example 4 | Example 5 | Example 6 |
|---|---|---|---|---|---|---|---|---|
| Structure of backlight unit | Polarized light reflection film |  | Circular polarization reflection film 1 (linearly polarized light reflection film + λ/4 film) | Circular polarization reflection film 1 | Circular polarization reflection film 1 | Circular polarization reflection film 1 | Circular polarization reflection film 1 | Circular polarization reflection film 1 |
|  | Perforated reflective plate | Structure | Perforated reflective plate 1A (silver reflection film 1 + white PET) | Perforated reflective plate 2A (silver reflection film 2 + white PET) | Perforated reflective plate 3A (silver reflection film 3 + white PET) | Perforated reflective plate 1B (silver reflection film 1 + white PET) | Perforated reflective plate 2B (silver reflection film 2 + white PET) | Perforated reflective plate 1C (silver reflection film 1 + white PET) |
|  |  | Reflectivity on viewing side | 99% | 99% | 99% | 99% | 99% | 99% |
|  |  | Reflectivity on light source side | 99% | 99% | 99% | 99% | 99% | 99% |
|  |  | Depolarization degree on viewing side | 4% | 30% | 60% | 4% | 30% | 4% |
|  |  | Depolarization degree on light source side | 95% | 95% | 95% | 95% | 95% | 95% |
|  |  | Opening ratio | 10% | 10% | 10% | 25% | 25% | 50% |
|  |  |  | — | — | — | — | — | — |
|  | Light source |  | White LED | White LED | White LED | White LED | White LED | White LED |
|  | Rear-side reflective plate |  | White PET | White PET | White PET | White PET | White PET | White PET |
| Evaluation | Front luminance |  | B | C | D | C | D | D |

|  |  |  | Example 7 | Example 8 | Example 9 | Comparative Example 1 | Comparative Example 2 | Comparative Example 3 |
|---|---|---|---|---|---|---|---|---|
| Structure of backlight unit | Polarized light reflection film |  | Circular polarization reflection film 1 | Circular polarization reflection film 1 | Circular polarization reflection film 2 (λ/4 film + cholesteric liquid crystal layer) | None | Linearly polarized light reflection film | Circular polarization reflection film 1 |
|  | Perforated reflective plate | Structure | Perforated reflective plate 1D (silver reflection film 1 + laminated white PET) | Perforated reflective plate 1A | Perforated reflective plate 1A | Perforated reflective plate 1 (white PET) | Perforated reflective plate 1 | Perforated reflective plate 4 (silver reflection film 4 + white PET) |
|  |  | Reflectivity on viewing side | 99% | 99% | 99% | 99% | 99% | 99% |
|  |  | Reflectivity on light source side | 99% | 99% | 99% | 99% | 99% | 99% |
|  |  | Depolarization degree on viewing side | 4% | 4% | 4% | 95% | 95% | 70% |
|  |  | Depolarization degree on light source side | 95% | 95% | 95% | 95% | 95% | 95% |
|  |  | Opening ratio | 10% | 10% | 10% | 10% | 10% | 10% |
|  |  |  | — | Lens sheet | — | — | — | — |
|  | Light source |  | White LED | White LED | White LED | White LED | White LED | White LED |
|  | Rear-side reflective plate |  | White PET | White PET | White PET | White PET | White PET | White PET |
| Evaluation | Front luminance |  | A | A | B | F | Reference | E |

TABLE 2

| | | | Example 10 | Comparative Example 4 |
|---|---|---|---|---|
| Structure of backlight unit | Polarized light reflection film | | Circular polarization reflection film 1 | Linearly polarized light reflection film |
| | Perforated reflective plate | Structure | Perforated reflective plate 1A | Perforated reflective plate 1 |
| | | Reflectivity on viewing side | 99% | 99% |
| | | Reflectivity on light source side | 99% | 99% |
| | | Depolarization degree on viewing side | 4% | 95% |
| | | Depolarization degree on light source side | 95% | 95% |
| | | Opening ratio | 10% | 10% |
| | | | Wavelength conversion layer | Wavelength conversion layer |
| | Light source | | Blue LED | Blue LED |
| | Rear-side reflective plate | | White PET | White PET |
| Evaluation | Front luminance | | A | Reference |

As listed in Table 1 and Table 2, the front luminance of each example according to the present invention was D or higher, in other words, a front luminance of 105% or greater of the front luminance of the reference was obtained, and thus the effect of improving the luminance by using the configurations of the present invention was confirmed. Particularly in a case where the ratio between the perforated reflective plate and the opening diameter was increased or the directivity of light emitted from fine holes of the perforated reflective plate was improved by disposing a lens as in Examples 7 and 8, the effect of improving the luminance was extremely high.

EXPLANATION OF REFERENCES 10, 10A, 40, 50: backlight unit
12: rear-side reflective plate
12a: reflection surface
14, 15: light source
20: perforated reflective plate
21: light source-side reflection surface (light source-side surface)
22: emission-side reflection surface (emission-side surface)
24: fine hole
24a, 24b: opening
30, 35: circular polarization reflection film
32: $\lambda/4$ film
34: linearly polarized light reflection film
36: circular polarization separation film
38: $\lambda/4$ film
39: backlight-side polarizing plate
42: lens sheet
44: lens portion
52: wavelength conversion layer
54: wavelength conversion material
L: light
$L_1$: first linearly polarized light
$L_2$: second linearly polarized light
$L_L$: left circular polarization
$L_R$: right circular polarization

What is claimed is:

1. A direct backlight unit comprising:
a rear-side reflective plate;
a light source which is disposed on a reflection surface side of the rear-side reflective plate;
a perforated reflective plate which is disposed to face the rear-side reflective plate via the light source and has a plurality of fine holes, which penetrate from a light source-side surface to an emission-side surface facing the light source-side surface and transmit light, and in which both the light source-side surface and the emission-side surface are reflection surfaces and a depolarization degree of the emission-side surface is 30% or less; and
a circular polarization reflection film which is disposed on the emission-side surface of perforated reflective plate on the emission side.

2. The direct backlight unit according to claim 1, wherein the depolarization degree of the surface of the perforated reflective plate on the light source side is 90% or greater.

3. The direct backlight unit according to claim 1, wherein the emission-side surface of the perforated reflective plate is a specular reflection surface.

4. The direct backlight unit according to claim 1, wherein an area ratio of openings of the fine holes in the surface of the perforated reflective plate on the emission side is in a range of 10% to 50%.

5. The direct backlight unit according to claim 1, wherein a ratio of a thickness of the perforated reflective plate to an opening diameter of the fine holes in the surface of the perforated reflective plate on the emission side is 2 or greater.

6. The direct backlight unit according to claim 1, wherein the openings of the fine holes of the perforated reflective plate on the light source-side surface respectively have a lens.

7. The direct backlight unit according to claim 1, wherein the circular polarization reflection film is formed of a $\lambda/4$ film and a linearly polarized light reflection film which are disposed in order from the perforated reflective plate side.

8. The direct backlight unit according to claim 1, wherein the circular polarization reflection film includes a cholesteric liquid crystal layer.

9. The direct backlight unit according to claim 1, wherein a wavelength conversion layer which receives light from the light source and emits light having a wavelength different from that of the light is provided between the light source and the perforated reflective plate.

* * * * *